United States Patent
Polehn

(10) Patent No.: US 11,916,643 B2
(45) Date of Patent: Feb. 27, 2024

(54) SYSTEMS AND METHODS FOR PROVIDING SATELLITE EARTH STATION AND CELLULAR NETWORK SHARING NOISE CANCELLATION

(71) Applicant: Verizon Patent and Licensing Inc., Basking Ridge, NJ (US)

(72) Inventor: Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 17/447,877

(22) Filed: Sep. 16, 2021

(65) Prior Publication Data

US 2023/0078620 A1 Mar. 16, 2023

(51) Int. Cl.
*H04B 7/155* (2006.01)
*H04L 5/00* (2006.01)

(52) U.S. Cl.
CPC ....... *H04B 7/15585* (2013.01); *H04L 5/0048* (2013.01)

(58) Field of Classification Search
CPC .......................... H04B 7/15585; H04L 5/0048
See application file for complete search history.

(56) References Cited

U.S. PATENT DOCUMENTS

| | | | | |
|---|---|---|---|---|
| 11,509,435 | B2 * | 11/2022 | Tsui | H04L 25/0204 |
| 2021/0036820 | A1 * | 2/2021 | Ahmad | H04L 25/0204 |

OTHER PUBLICATIONS

Common Public Radio Interface, Website: http://www.cpri.info/spec.html, Obtained Sep. 16, 2021, 4 Pages.
Common Public Radio Interface (CPRI); Interface Specification, Website: http://www.cpri.info/downloads/CPRI_v_7_0_2015-10-09.pdf, Oct. 9, 2015, 128 Pages.
S. Bradner, "Key words for use in RFCs to Indicate Requirement Levels," Website https://www.rfc-editor.org/info/rfc2119, CP 14, RFC 2119, DOI 10.17487/RFC2119, Mar. 1997, 3 Pages.
Rosen et al., "GP/MPLS IP Virtual Private Networks (VPNs)", Website: https://www.rfc-editor.org/info/rfc4364, RFC 4364, DOI 10.17487/RFC4364, Feb. 2006, 47 Pages.
B. Leiba, "Ambiguity of Uppercase vs Lowercase in RFC 2119 Key Words", Website: https://www.rfc-editor.org/info/rfc8174, BCP 14, RFC 8174, DOI 10.17487/RFC8174, May 2017, 4 Pages.
Deering et al., "Internet Protocol, Version 6 (IPv6) Specification", Website: https://www.rfc-editor.org/info/rfc8200, STD 86, RFC 8200, DOI 10.17487/RFC8200, Jul. 2017, 42 Pages.

(Continued)

*Primary Examiner* — Jay P Patel

(57) ABSTRACT

A device may receive a reference signal identifying a radio signal provided to a radio unit associated with a user equipment located substantially near an earth station and identifying a user equipment signal generated by the user equipment. The device may receive an earth station target signal generated by the earth station and a parasitic signal. The device may generate a noise cancellation signal based on the reference signal, the earth station target signal, and the parasitic signal. The device may cause the noise cancellation signal to be applied by the earth station to eliminate the parasitic signal.

20 Claims, 9 Drawing Sheets

(56) References Cited

OTHER PUBLICATIONS

Filsfils et al., "Segment Routing Architecture", Website: https://www.rfc-editor.org/info/rfc8402, RFC 8402, DOI 10.17487/RFC8402, Jul. 2018, 32 Pages.

Filsfils et al., "IPv6 Segment Routing Header (SRH)", Website: https://www.rfc-editor.org/info/rfc8754, RFC 8754, DOI 10.17487/RFC8754, Mar. 2020, 27 Pages.

Filsfils et al., "Segment Routing over IPv6 (SRv6) Network Programming", Website: https://www.rfc-editor.org/info/rfc8986, RFC 8986, DOI 10.17487/RFC8986, Feb. 2021, 40 Pages.

Hegde et al., Seamless SR Problem Statement, draft-hegdespring-mpls-seamless-sr-05 (work in progress), Feb. 2021, 26 Pages.

Rosen et al., "Multiprotocol Label Switching Architecture", Website: https://www.rfc-editor.org/info/rfc3031, RFC 3031, DOI 10.17487/RFC3031, Jan. 2001, 61 Pages.

* cited by examiner

SYSTEMS AND METHODS FOR PROVIDING SATELLITE EARTH STATION AND CELLULAR NETWORK SHARING NOISE CANCELLATION

BACKGROUND

An earth station is a terrestrial radio station designed for extraplanetary telecommunication with satellites, spacecraft or for reception of radio waves from astronomical radio sources.

DETAILED DESCRIPTION OF PREFERRED EMBODIMENTS

Figure 1A:
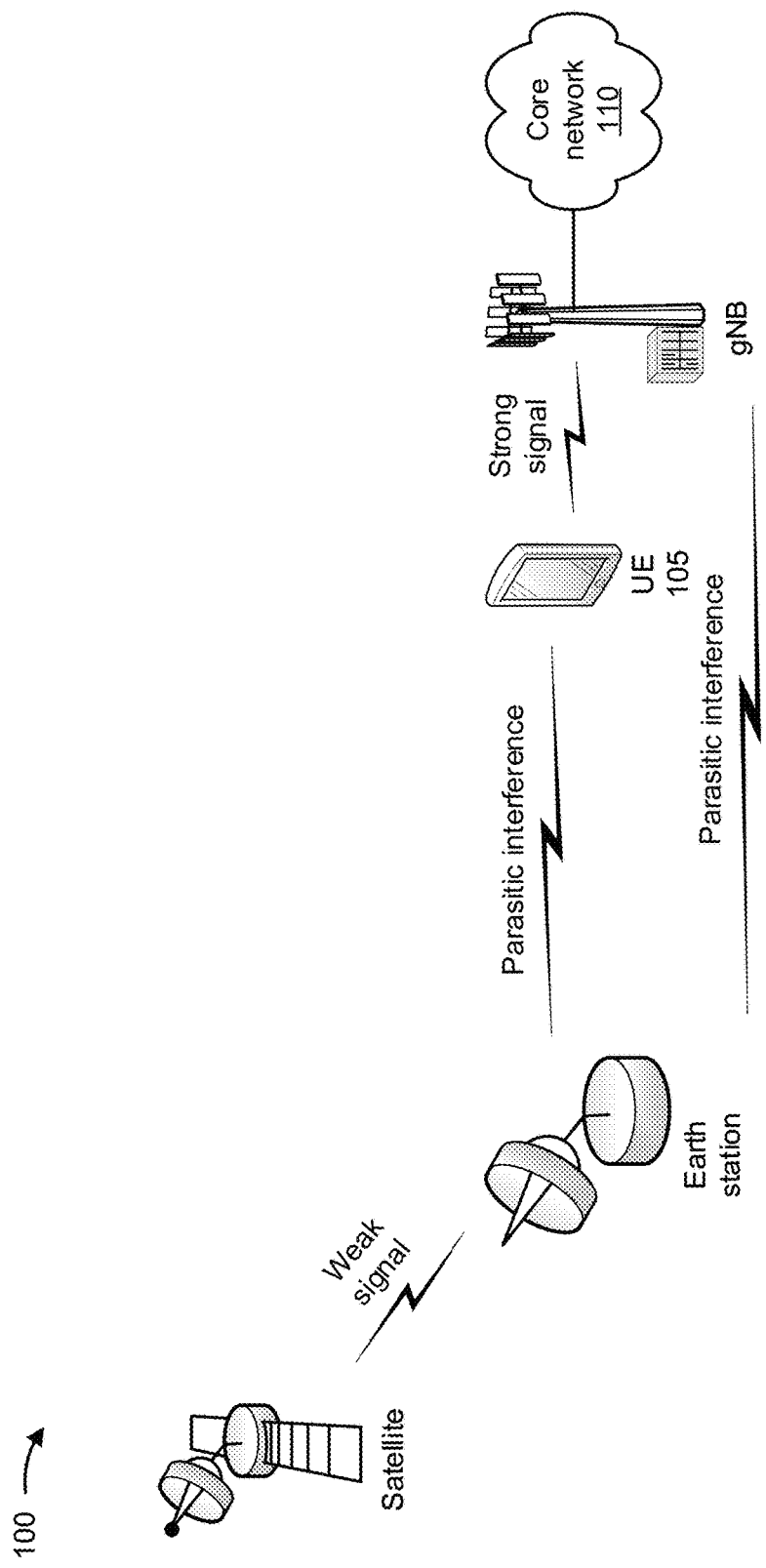
FIGS. 1A-1F are diagrams of one or more example implementations described herein.

The following detailed description of example implementations refers to the accompanying drawings. The same reference numbers in different drawings may identify the same or similar elements.

There are significant challenges to sharing a satellite spectrum due to a large power level difference between earth stations and terrestrial systems (e.g., a 5G network of gNodeBs (gNBs) supporting user equipment (UEs)). Although a satellite signal may be vertically polarized, and a terrestrial signal may be horizontally polarized, such orientations may not provide sufficient isolation alone of the signals. A noise floor of an earth station may be −146 decibels relative to one milliwatt (dBm) (e.g., since satellites are typically very far away) while a noise floor of a gNB may be about −95 dBm. The 50 dBm margin may be very difficult to achieve without imposing significant power level restrictions on both the gNB and the UE within a band and without creating large coverage holes. For example, assume that an earth station is located near a gNB that shares spectrum. To avoid interference, the gNB must be equipped with highly directional antennas that are steered away from the earth station. If located within one kilometer of the earth station, the gNB would need to operate below four Watts (W). Thus, the gNB may have coverage holes in the vicinity of the earth station.

Furthermore, when a base station, such as a gNB, and a UE are located near an earth station, the base station, (e.g., gNB) and the UE may be sources of parasitic interference for the earth station. The base station (e.g., gNB) may be positioned further away from the earth station and may employ directional antennas to attempt to limit the parasitic interference. However, such an arrangement may actually compound the problem because a weaker base station signal near the earth station may cause a power control signal of the UE to increase. This may be controlled by suppressing a maximum power level of the UE, but results in coverage holes in the vicinity of the earth station.

Thus, current techniques for satellite and terrestrial spectrum sharing consume computing resources (e.g., processing resources, memory resources, communication resources, and/or the like), networking resources, and/or the like associated with the UE and the earth station creating interference and not operating correctly, identifying the interference between the UE and the earth station, correcting the interference between the UE and the earth station, attempting to retrieve data not received due to the interference, and/or the like.

Some implementations described herein provide a device (e.g., a radio unit, a network device, and/or a far edge device) that provides satellite earth station and radio frequency (RF) network sharing noise cancellation. For example, the device may receive a reference signal identifying a radio signal provided to a radio unit associated with a UE located substantially near an earth station and identifying a UE signal generated by the UE. The device may receive an earth station target signal generated by the earth station and a parasitic signal, and the device may generate a noise cancellation signal based on the reference signal, the earth station target signal, and the parasitic signal. The device may cause the noise cancellation signal to be applied by the earth station to eliminate the parasitic signal.

In this way, the device (e.g., a radio unit, a network device, and/or a far edge device) provides satellite earth station and cellular network sharing noise cancellation. For example, multiple radio units may be positioned near an earth station. The multiple radio units may include highly-oriented directional antennas pointing away from the earth station. A special radio unit may be located near the earth station and may receive a satellite signal and a parasitic signal captured by the earth station. The far edge device may communicate with the special radio unit and a network supporting the multiple radio units. The far edge device may receive a reference signal identifying a radio signal generated by a radio unit associated with the UE and a UE signal generated by the UE. The far edge device may compare the reference signal with the satellite signal and the parasitic signal and may calculate a signal to cancel the parasitic signal based on the comparison. Thus, implementations described herein conserve computing resources, networking resources, and/or the like that would otherwise have been consumed by incorrect operation of the UE and the earth station due to interference, identifying the interference between the UE and the earth station, correcting the interference between the UE and the earth station, attempting to retrieve data not received due to the interference, and/or the like.

FIGS. 1A-1F are diagrams of one or more example implementations 100 described herein. As shown in FIG. 1A, a satellite may be associated with an earth station, a UE 105, a base station (e.g., a gNB), and a core network 110. The satellite may include an astronomical radio source for telecommunication with the earth station. The earth station may include a terrestrial radio station designed for extraplanetary telecommunication with the satellite or for reception of radio waves from astronomical radio sources (e.g., the satellite). The UE 105 may include a mobile phone, a laptop computer, a tablet computer, a drone, an autonomous vehicle, and/or the like. The base station (e.g., gNB) may include a base transceiver station, a radio base station, or similar devices with radio transmitters, antennas, and/or the like. The core network 110 may include an example architecture of a 5G next generation (NG) core network included in a 5G wireless telecommunications system, and may include physical elements, virtual elements, or a combination of physical and virtual elements. Although implementations are described herein in connection with a 5G NG core network and a gNB, the implementations may be utilized with other types of core networks and base stations, such as a 4G core network and eNBs. Further details of the earth station, the UE 105, and the core network 110 are provided elsewhere herein.

As further shown in FIG. 1A, the satellite and the earth station may have established a weak communication signal, and the UE 105 and the base station (e.g., gNB) may have established a strong communication signal. In such a scenario, the earth station may experience parasitic interference from the UE 105 and base station (e.g., gNB). The base station (e.g., gNB) may be relocated farther away from the earth station and directional antennas may be employed with the base station (e.g., gNB). However, this may actually compound the parasitic interference because a weaker gNB signal near the earth station causes an increase of power control by the UE 105 (e.g., this is automatic in any 4G or 5G network). This can be controlled by suppressing a maximum power level of the UE 105, but may result in a large coverage hole around the earth station.

Figure 1B:
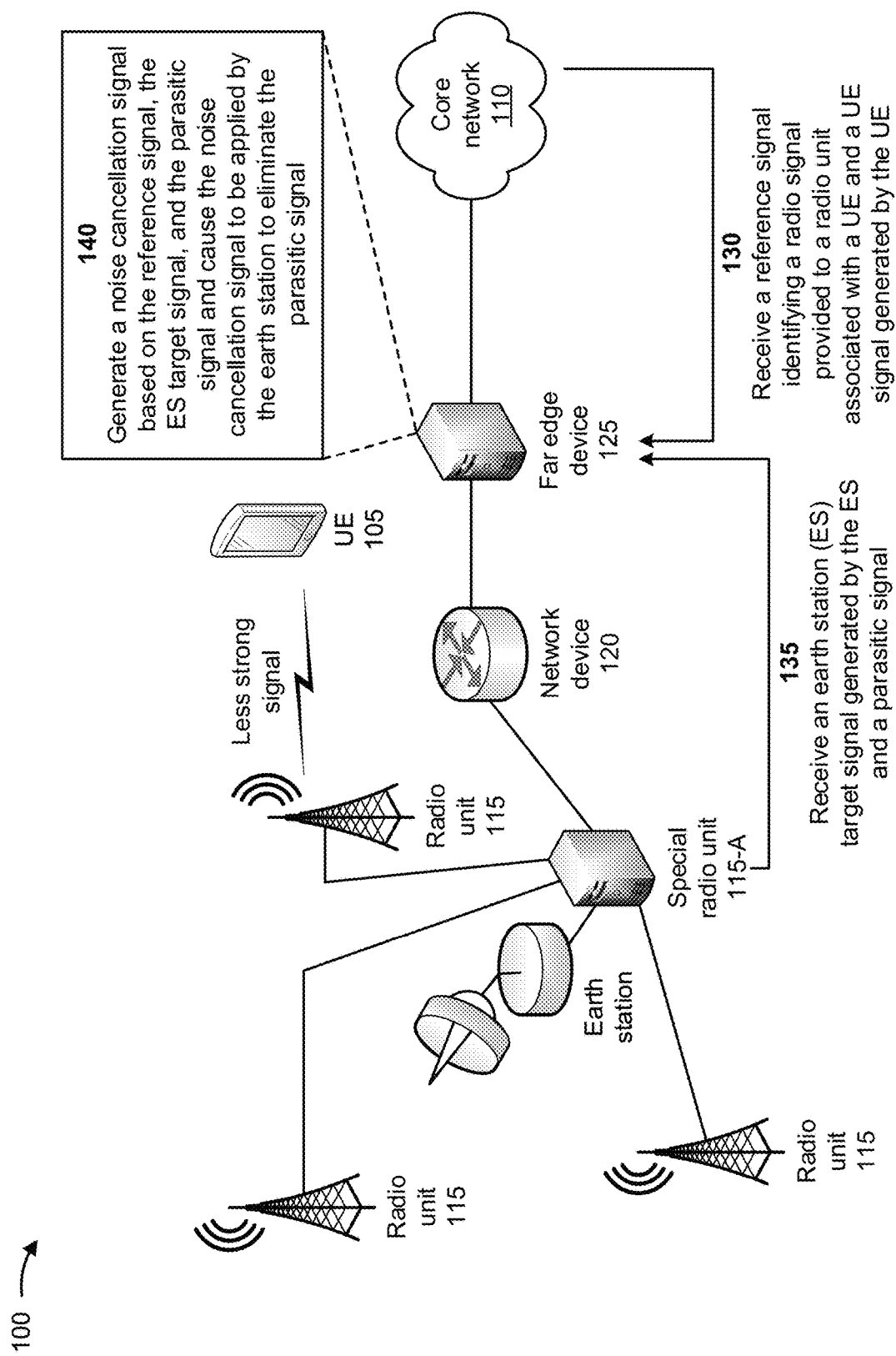

As shown in FIG. 1B, instead of utilizing the base station (e.g., gNB), multiple radio units 115 and a special radio unit 115-A may be provided around the earth station. The special radio unit 115-A may connect to the multiple radio units 115 and to the earth station. The special radio unit 115-A may also connect to a network device 120 that is connected to a far edge device 125. The far edge device 125 may connect to the core network 110. The UE 105 and one of the radio units 115 may establish a less strong communication signal (e.g., than between the UE 105 and the gNB, as shown in FIG. 1A). The UE 105 may be located closer to the radio unit 115 (e.g., than to the gNB), which may enable the UE 105 and the radio unit 115 to transmit signals at lower power levels than if the radio unit 115 was located farther away from the UE 105. This may enable noise cancellation (e.g., described below) to be performed more easily since a magnitude of the two signals is not as large. Further details of the radio units 115, the special radio unit 115-A, the network device 120, and the far edge device 125 are provided elsewhere herein.

As further shown in FIG. 1B, and by reference number 130, the far edge device 125 may receive, from the core network 110, a reference signal identifying a radio signal provided to the radio unit 115 associated with the UE 105 and a UE signal generated by the UE 105. For example, the radio signal provided to the radio unit 115, associated with the UE 105, may include a downlink time division duplex signal, and the UE signal generated by the UE 105 may include an uplink time division duplex signal received by the radio unit 115 associated with the UE 105. The far edge device 125 may utilize the radio signal provided to the radio unit 115 associated with the UE 105 and the UE signal generated by the UE 105 as a reference signal to compare to an earth station target signal and a parasitic signal associated with the earth station, as described below.

As further shown in FIG. 1B, and by reference number 135, the far edge device 125 may receive, from the special radio unit 115-A, an earth station target signal generated by the earth station and a parasitic signal associated with the earth station. The earth station target signal may include a desired signal to be transmitted by the earth station to the satellite. However, the earth station target signal is degraded by the presence of the parasitic signal. The parasitic signal may be generated by the radio unit connected to the UE 105, by the UE 105, and/or the like. The special radio unit 115-A may receive the earth station target signal and the parasitic signal from the earth station via a tap provided inline with a low noise amplifier of the earth station. The special radio unit 115-A may provide the earth station target signal and the parasitic signal to the network device 120, and the network device 120 may forward the earth station target signal and the parasitic signal to the far edge device 125. The far edge device 125 may receive the earth station target signal and the parasitic signal from the network device 120.

As further shown in FIG. 1B, and by reference number 140, the far edge device 125 may generate a noise cancellation signal based on the reference signal, the earth station target signal, and the parasitic signal and may cause the noise cancellation signal to be applied by the earth station to eliminate the parasitic signal. For example, when generating the noise cancellation signal, the far edge device 125 may determine whether a combination of the earth station target signal and the parasitic signal matches the reference signal. When the combination of the earth target signal and the parasitic signal matches the reference signal, the far edge device 125 may calculate an inverted and delayed signal as the noise cancellation signal. In some implementations, the noise cancellation signal is an inverted and delayed form of the parasitic signal so that the noise cancellation signal eliminates the parasitic signal.

The far edge device 125 may provide the noise cancellation signal to the special radio unit 115-A, via the network device 120, and the special radio unit 115-A may provide the noise cancellation signal to the earth station. The earth station may receive the noise cancellation signal and may apply the noise cancellation signal to eliminate the parasitic signal. This may enable the earth station to transmit the earth station target signal without the earth station target signal being degraded by the parasitic signal.

Figure 1C:
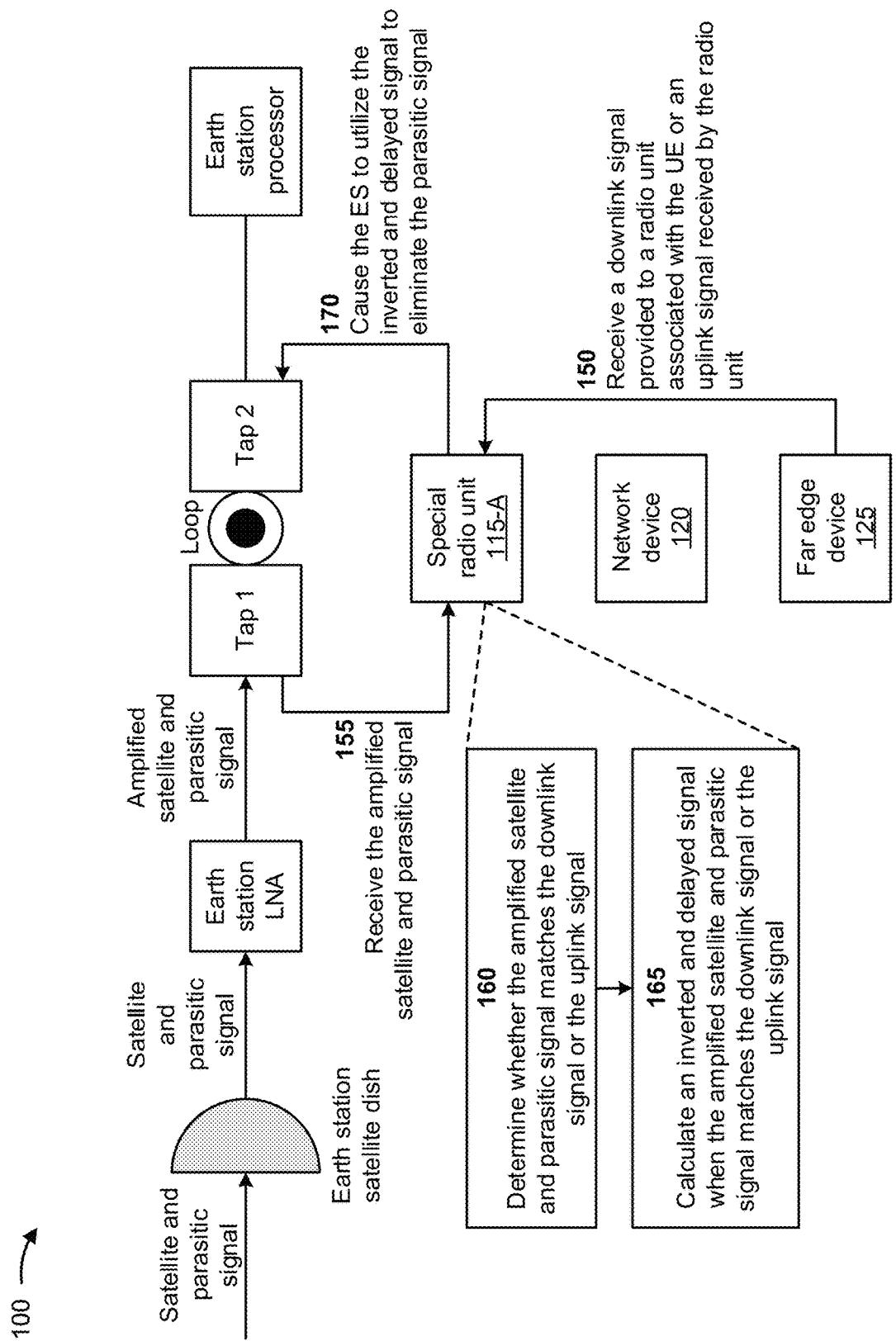

As shown in FIG. 1C, the earth station may include an earth station satellite dish, an earth station low noise amplifier (LNA), a first tap (e.g., Tap 1), a loop, a second tap (e.g., Tap 2), and an earth station processor. The earth station satellite dish may receive a satellite and parasitic signal that includes an earth station target signal and a parasitic signal. The earth station satellite dish may provide the satellite and parasitic signal to the earth station LNA, and the earth station LNA may generate an amplified satellite and parasitic signal. The earth station LNA may provide the amplified satellite and parasitic signal to the first tap.

As further shown in FIG. 1C, and by reference number 150, the special radio unit 115-A may receive, from the far edge device 125, a downlink signal provided to a radio unit 115 associated with the UE 105 or an uplink signal received by the radio unit 115 from the UE 105. The downlink signal provided to the radio unit 115 may include a downlink time division duplex signal, and the uplink signal received by the radio unit 115 may include an uplink time division duplex signal. The far edge device 125 may receive the downlink signal or the uplink signal from the core network 110. The far edge device 125 may provide the downlink signal or the uplink signal to the special radio unit 115-A, via the network device 120, and the special radio unit 115-A may receive the downlink signal or the uplink signal. The special radio unit 115-A may utilize the downlink signal or the uplink signal as a reference signal to compare to the amplified satellite and parasitic signal associated with the earth station.

As further shown in FIG. 1C, and by reference number 155, the special radio unit 115-A may receive the amplified satellite and parasitic signal from the first tap of the earth station. For example, the first tap of the earth station may be configured to provide an output of the earth station LNA (e.g., the amplified satellite and parasitic signal) to the special radio unit 115-A, and the special radio unit 115-A may receive the amplified satellite and parasitic signal based on the configuration of the first tap.

As further shown in FIG. 1C, and by reference number 160, the special radio unit 115-A may determine whether the amplified satellite and parasitic signal matches the downlink signal or the uplink signal. For example, since the core network 110 is a time division duplex system, the special radio unit 115-A may compare the amplified satellite and parasitic signal with the downlink signal or the uplink signal depending on a time division duplex state when the amplified satellite and parasitic signal is received by the special radio unit 115-A. During a downlink time division duplex time window, the special radio unit 115-A may compare the amplified satellite and parasitic signal to the downlink signal to determine whether the amplified satellite and parasitic signal matches the downlink signal. During an uplink time division duplex time window, the special radio unit 115-A may compare the amplified satellite and parasitic signal to the uplink signal to determine whether the amplified satellite and parasitic signal matches the uplink signal.

As further shown in FIG. 1C, and by reference number 165, the special radio unit 115-A may calculate an inverted and delayed signal when the amplified satellite and parasitic signal matches the downlink signal or the uplink signal. For example, when the special radio unit 115-A determines that the amplified satellite and parasitic signal matches the downlink signal or the uplink signal (e.g., depending on a time division duplex state), the special radio unit 115-A may calculate the inverted and delayed signal. In some implementations, the inverted and delayed signal may include an inverted and delayed form of the parasitic signal so that the inverted and delayed signal may eliminate the parasitic signal. In some implementations, when calculating the inverted and delayed signal, the special radio unit 115-A may identify a magnitude of the parasitic signal embedded in the amplified satellite and parasitic signal and may invert a quadrature of the parasitic signal, to calculate the inverted and delayed signal, based on identifying the magnitude of the parasitic signal.

As further shown in FIG. 1C, and by reference number 170, the special radio unit 115-A may cause the earth station to utilize the inverted and delayed signal to eliminate the parasitic signal. For example, when causing the earth station to utilize the inverted and delayed signal to eliminate the parasitic signal, the special radio unit 115-A may provide the inverted and delayed signal to the second tap of the earth station to cause the earth station to utilize the inverted and delayed signal and eliminate the parasitic signal. The inverted and delayed signal provided to the second tap may effectively cancel out the parasitic signal. The loop provided between the first tap and the second tap may provide a small amount of delay for processing by the earth station processor.

Figure 1D:
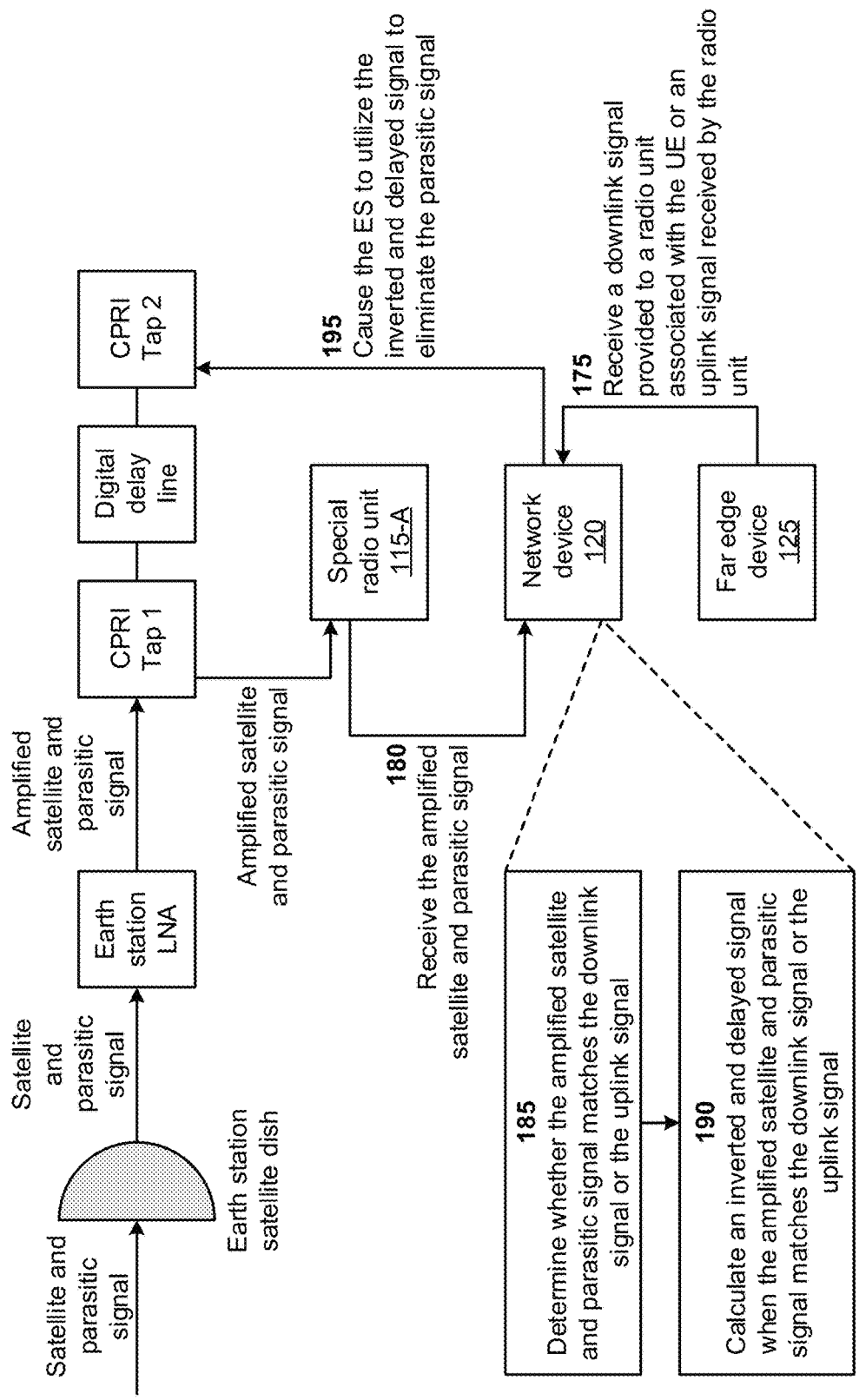

As shown in FIG. 1D, the earth station may include the earth station satellite dish, the earth station LNA, the first tap (e.g., common public radio interface (CPRI) Tap 1), a digital delay line, and the second tap (e.g., CPRI Tap 2). The earth station satellite dish may receive a satellite and parasitic signal that includes an earth station target signal and a parasitic signal. The earth station satellite dish may provide the satellite and parasitic signal to the earth station LNA, and the earth station LNA may generate an amplified satellite and parasitic signal. The earth station LNA may provide the amplified satellite and parasitic signal to the first tap.

As further shown in FIG. 1D, and by reference number 175, the network device 120 may receive, from the far edge device 125, a downlink signal provided to a radio unit 115 associated with the UE 105 or an uplink signal received by the radio unit 115 from the UE 105. The downlink signal provided to the radio unit 115 may include a downlink time division duplex signal, and the uplink signal received by the radio unit 115 may include an uplink time division duplex signal. The far edge device 125 may receive the downlink signal or the uplink signal from the core network 110. The far edge device 125 may provide the downlink signal or the uplink signal to the network device 120, and the network device 120 may receive the downlink signal or the uplink signal. The network device 120 may utilize the downlink signal or the uplink signal as a reference signal to compare to the amplified satellite and parasitic signal associated with the earth station.

As further shown in FIG. 1D, and by reference number 180, the network device 120 may receive the amplified satellite and parasitic signal from the special radio unit 115-A. For example, the first tap of the earth station may be configured to provide an output of the earth LNA (e.g., the amplified satellite and parasitic signal) to the special radio unit 115-A, and the special radio unit 115-A may receive the amplified satellite and parasitic signal based on the configuration of the first tap. The special radio unit 115-A may provide the amplified and parasitic signal to the network device 120, and the network device 120 may receive the amplified and parasitic signal.

As further shown in FIG. 1D, and by reference number 185, the network device 120 may determine whether the amplified satellite and parasitic signal matches the downlink signal or the uplink signal. For example, since the core network 110 is a time division duplex system, the network device 120 may compare the amplified satellite and parasitic signal with the downlink signal or the uplink signal depending on a time division duplex state when the amplified satellite and parasitic signal is received by the network device 120. During a downlink time division duplex time window, the network device 120 may compare the amplified satellite and parasitic signal to the downlink signal to determine whether the amplified satellite and parasitic signal matches the downlink signal. During an uplink time division duplex time window, the network device 120 may compare the amplified satellite and parasitic signal to the uplink signal to determine whether the amplified satellite and parasitic signal matches the uplink signal.

As further shown in FIG. 1D, and by reference number 190, the network device 120 may calculate an inverted and delayed signal when the amplified satellite and parasitic signal matches the downlink signal or the uplink signal. For example, when the network device 120 determines that the amplified satellite and parasitic signal matches the downlink signal or the uplink signal (e.g., depending on a time division duplex state), the network device 120 may calculate the inverted and delayed signal. In some implementations, the inverted and delayed signal may include an inverted and delayed form of the parasitic signal so that the inverted and delayed signal may eliminate the parasitic signal. In some implementations, when calculating the inverted and delayed signal, the network device 120 may identify a magnitude of the parasitic signal embedded in the amplified satellite and parasitic signal and may invert a quadrature of the parasitic signal, to calculate the inverted and delayed signal, based on identifying the magnitude of the parasitic signal.

As further shown in FIG. 1D, and by reference number 195, the network device 120 may cause the earth station to utilize the inverted and delayed signal to eliminate the parasitic signal. For example, when causing the earth station to utilize the inverted and delayed signal to eliminate the parasitic signal, the network device 120 may provide the inverted and delayed signal to the second tap of the earth station to cause the earth station to utilize the inverted and delayed signal and eliminate the parasitic signal. The inverted and delayed signal provided to the second tap may effectively cancel out the parasitic signal. The digital delay line provided between the first tap and the second tap may provide a small amount of delay for processing the inverted and delayed signal.

In some implementations, the network device 120 may forgo calculating the inverted and delayed signal and causing the earth station to utilize the inverted and delayed signal when the satellite and parasitic signal fails to match the downlink signal or the uplink signal.

Figure 1E:
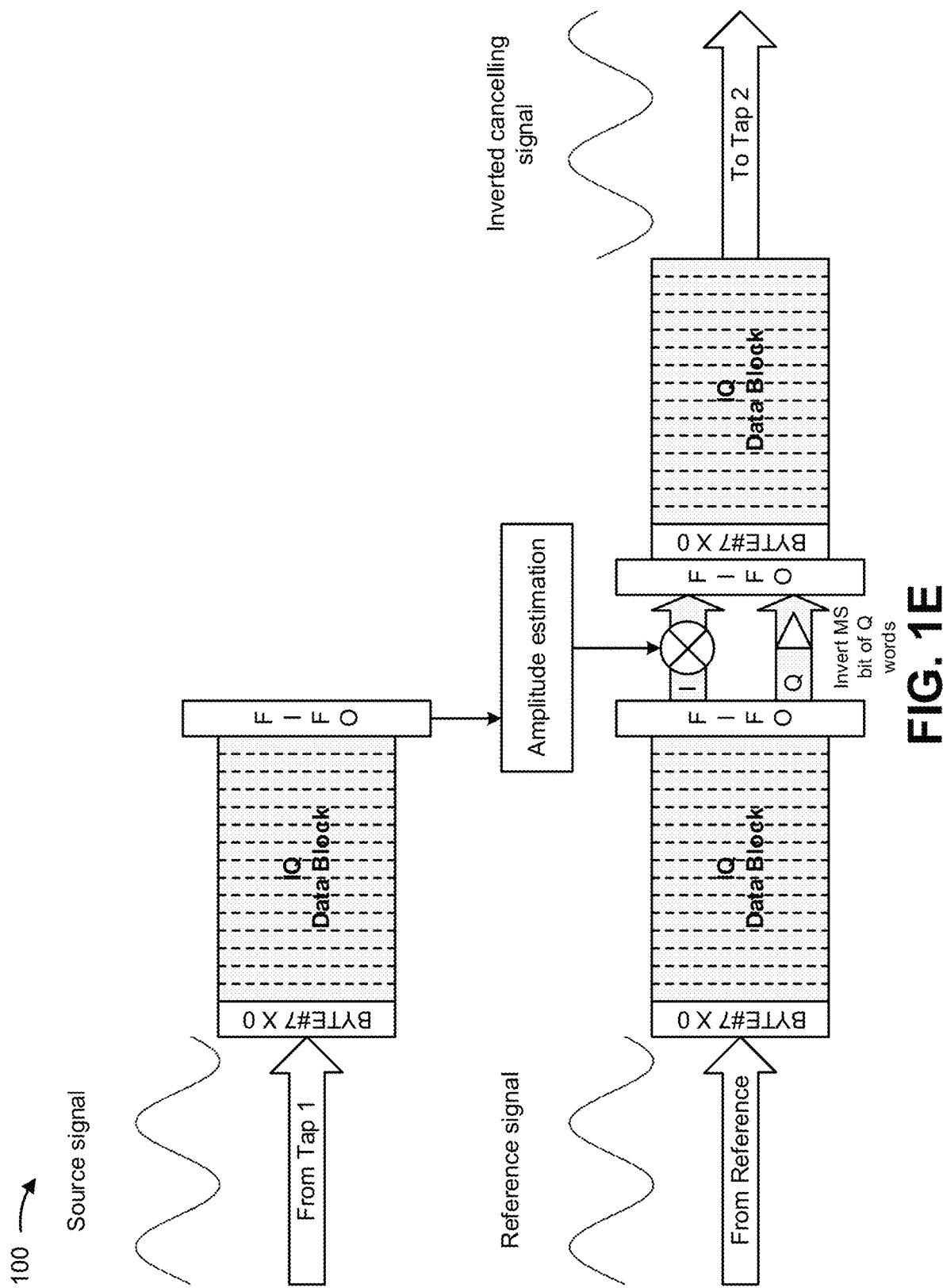

FIG. 1E is a diagram depicting how the special radio unit 115-A or the network device 120 generates the inverted and delayed signal. As shown, a source signal (e.g., the satellite and parasitic signal), received from the first tap of the earth station, may be processed by an in-phase and quadrature (IQ) data block and a first-in first-out (FIFO) component to generate an in-phase (e.g., magnitude) component and a quadrature component of the source signal. An amplitude of the in-phase component of the source signal may then be estimated. A reference signal (e.g., the downlink signal or the uplink signal), received from the far edge device 125, may be processed by another IQ data block and another FIFO component to generate an in-phase (e.g., magnitude) component and a quadrature component of the reference signal.

In order to accurately cancel the parasitic signal from the source signal, the special radio unit 115-A or the network device 120 may match the magnitude (e.g., the in-phase component) of the parasitic signal embedded in the source signal. The in-phase component of the source signal may include the satellite signal and the parasitic signal. However, the satellite signal is very small, in comparison to the parasitic signal, and the special radio unit 115-A or the network device 120 may adjust the satellite signal by decrementing in-phase bits of the reference signal, as needed. For example, the special radio unit 115-A or the network device 120 may change a sign of the quadrature component of the reference signal by inverting a most significant (MS) bit of the quadrature component. After changing the sign of the quadrature component of the reference signal, the special radio unit 115-A or the network device 120 may further process the reference signal with still another FIFO component and still another ID data block to generate an inverted canceling signal (e.g., the inverted and delayed signal).

Figure 1F:
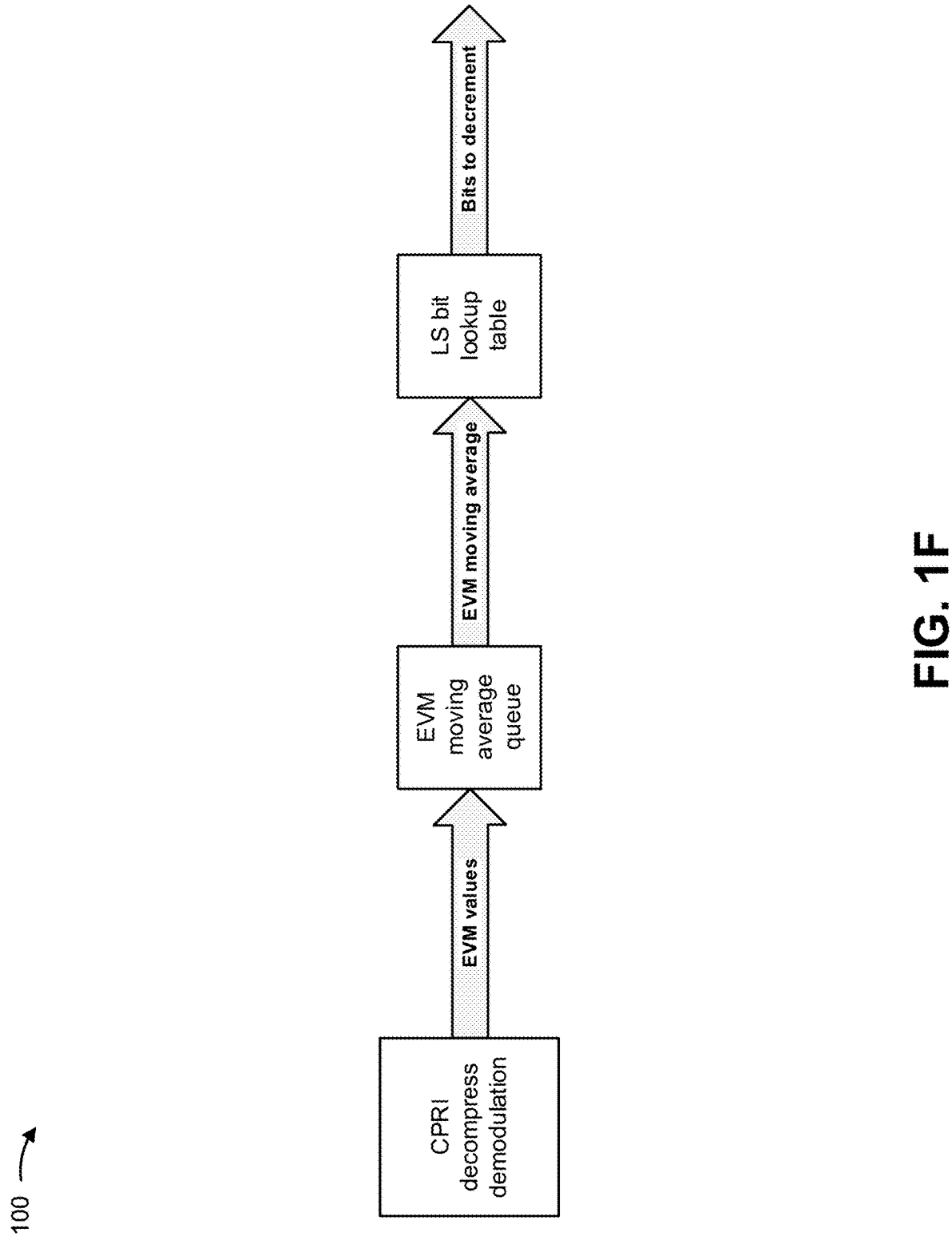

FIG. 1F is a diagram depicting how the special radio unit 115-A or the network device 120 estimates the amplitude of the in-phase component of the source signal. To estimate the amplitude of the in-phase component of the source signal (e.g., a value to decrement an in-phase component of the parasitic signal), the special radio unit 115-A or the network device 120 may utilize CPRI decompress demodulation to extract error vector magnitude (EVM) values from the source signal. Each of the EVM values may include a magnitude of error when the special radio unit 115-A or the network device 120 demodulates the source signal. In this context, the source signal appears to the special radio unit 115-A or the network device 120 as interference and hence, the larger the source signal the larger the EVM values are to the special radio unit 115-A or the network device 120.

The special radio unit 115-A or the network device 120 may utilize an EVM moving average queue to calculate an EVM moving average of the EVM values. The EVM moving average may prevent large swings or spikes that appear as impulse noise to a noise cancellation signal (e.g., the inverted and delayed signal). The special radio unit 115-A or the network device 120 may utilize a least significant (LS) bit lookup table to map a magnitude of the EVM moving average and a magnitude of bits to which to decrement the reference signal. The LS bit lookup table may be calibrated by using a test set on final signals after utilization of inverted and delayed signals. When the EVM values for the source signal approaches null, the LS bit lookup table may be calibrated.

In this way, the device (e.g., special radio unit 115-A, the network device 120, and/or the far edge device 125) provides satellite earth station and fifth-generation network sharing noise cancellation. For example, multiple radio units 115 may be positioned near an earth station. The multiple radio units 115 may include highly-oriented directional antennas pointing away from the earth station. The special radio unit 115-A may be located near the earth station and may receive a satellite signal and a parasitic signal captured by the earth station. The far edge device 125 may communicate with the special radio unit 115-A and a 5G network supporting the multiple radio units 115. The far edge device 125 may receive a reference signal identifying a radio signal generated by a radio unit 115 associated with the UE 105 and a UE signal generated by the UE 105. The far edge device 125 may compare the reference signal with the satellite signal and the parasitic signal and may calculate a signal to cancel the parasitic signal based on the comparison. Thus, implementations described herein conserve computing resources, networking resources, and/or the like that would otherwise have been consumed by incorrect operation of the UE 105 and the earth station due to interference, identifying the interference between the UE 105 and the earth station, correcting the interference between the UE 105 and the earth station, attempting to retrieve data not received due to the interference, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
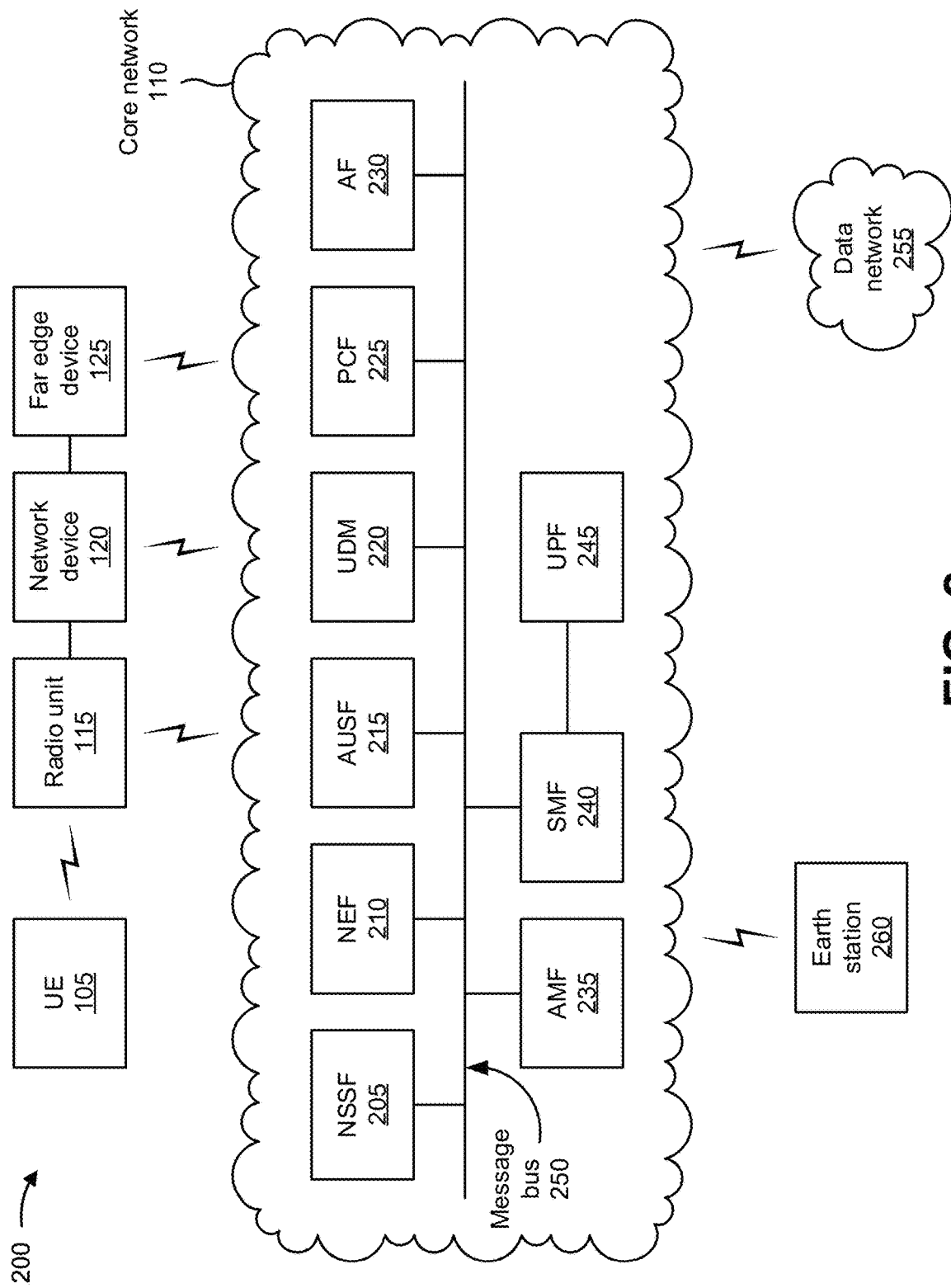
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include the UE 105, the core network 110, the radio unit 115, the network device 120, the far edge device 125, a data network 255, and an earth station 260. Devices and/or networks of example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

The radio unit 115 may support, for example, a cellular radio access technology (RAT). The radio unit 115 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for the UE 105. The radio unit 115 may transfer traffic between the UE 105 (e.g., using a cellular RAT), one or more base stations (e.g., using a wireless interface or a backhaul interface, such as a wired backhaul interface), and/or the core network 110. The radio unit 115 may provide one or more cells that cover geographic areas.

In some implementations, the radio unit 115 may perform scheduling and/or resource management for the UE 105 covered by the radio unit 115 (e.g., the UE 105 covered by a cell provided by the radio unit 115). In some implementations, the radio unit 115 may be controlled or coordinated by a network controller, which may perform load balancing, network-level configuration, and/or the like. The network controller may communicate with the radio unit 115 via a wireless or wireline backhaul. In some implementations, the radio unit 115 may include a network controller, a self-organizing network (SON) module or component, or a similar module or component. In other words, the radio unit 115 may perform network control, scheduling, and/or network management functions (e.g., for uplink, downlink, and/or sidelink communications of the UE 105 covered by the radio unit 115).

The network device 120 includes one or more devices capable of receiving, processing, storing, routing, and/or providing traffic (e.g., a packet and/or other information or metadata) in a manner described herein. For example, the network device 120 may include a router, such as a label switching router (LSR), a label edge router (LER), an ingress router, an egress router, a provider router (e.g., a provider edge router or a provider core router), a virtual router, or another type of router. Additionally, or alternatively, the network device 120 may include a gateway, a switch, a firewall, a hub, a bridge, a reverse proxy, a server (e.g., a proxy server, a cloud server, or a data center server), a load balancer, and/or a similar device. In some implementations, the network device 120 may be a physical device implemented within a housing, such as a chassis. In some implementations, the network device 120 may be a virtual device implemented by one or more computing devices of a cloud computing environment or a data center. In some implementations, a group of network devices 120 may be a group of data center nodes that are used to route traffic flow through a network.

The far edge device 125 includes one or more devices capable of receiving, generating, storing, processing, providing, and/or routing information, as described elsewhere herein. The far edge device 125 may include a communication device and/or a computing device. For example, the far edge device 125 may include a server, such as an application server, a client server, a web server, a database server, a host server, a proxy server, a virtual server (e.g., executing on computing hardware), or a server in a cloud computing system. In some implementations, the far edge device 125 includes computing hardware used in a cloud computing environment.

In some implementations, the core network 110 may include an example functional architecture in which systems and/or methods described herein may be implemented. For example, the core network 110 may include an example architecture of a 5G NG core network included in a 5G wireless telecommunications system. While the example architecture of the core network 110 shown in FIG. 2 may be an example of a service-based architecture, in some implementations, the core network 110 may be implemented as a reference-point architecture, a 4G core network, and/or the like.

As shown in FIG. 2, the core network 110 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access, mobile access, and/or the like, in the core network 110.

The PCF 225 includes one or more devices that provide a policy framework that incorporates network slicing, roaming, packet processing, mobility management, and/or the like.

The AF 230 includes one or more devices that support application influence on traffic routing, access to the NEF 210, policy control, and/or the like.

The AMF 235 includes one or more devices that act as a termination point for non-access stratum (NAS) signaling, mobility management, and/or the like.

The SMF 240 includes one or more devices that support the establishment, modification, and release of communication sessions in the wireless telecommunications system. For example, the SMF 240 may configure traffic steering policies at the UPF 245, enforce user equipment IP address allocation and policies, and/or the like.

The UPF 245 includes one or more devices that serve as an anchor point for intraRAT and/or interRAT mobility. The UPF 245 may apply rules to packets, such as rules pertaining to packet routing, traffic reporting, handling user plane QoS, and/or the like.

The message bus 250 represents a communication structure for communication among the functional elements. In other words, the message bus 250 may permit communication between two or more functional elements.

The data network 255 includes one or more wired and/or wireless data networks. For example, the data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The earth station 260 includes a terrestrial radio station designed for extraplanetary telecommunication with spacecraft or for reception of radio waves from astronomical radio sources. The earth station 260 may be located on the surface of the Earth and may communicate with spacecraft by transmitting and receiving radio waves in the super high frequency (SHF) or extremely high frequency (EHF) bands (e.g., microwaves). The earth station 260 may establish a telecommunications link by successfully transmitting radio waves to a spacecraft (or vice versa). The earth station 260 may utilize a parabolic antenna as a telecommunications device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
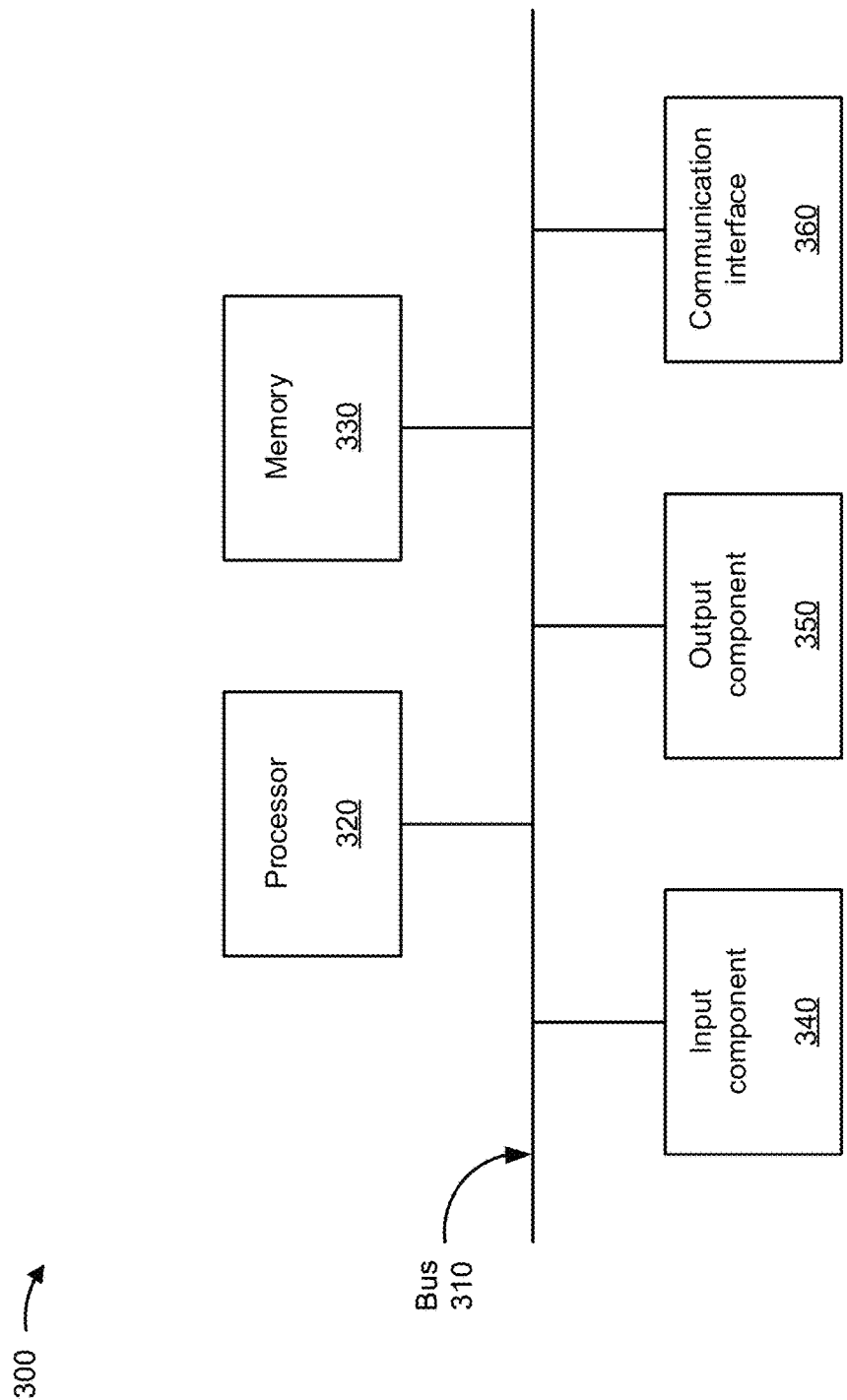
FIG. 3 is a diagram of example components of one or more devices of FIG. 2.

FIG. 3 is a diagram of example components of a device 300. The device 300 may correspond to the UE 105, the radio unit 115, the network device 120, the far edge device 125, the NSSF 205, the NEF 210, the AUSF 215, the UDM 220, the PCF 225, the AF 230, the AMF 235, the SMF 240, and/or the UPF 245. In some implementations, the UE 105, the radio unit 115, the network device 120, the far edge device 125, the NSSF 205, the NEF 210, the AUSF 215, the UDM 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
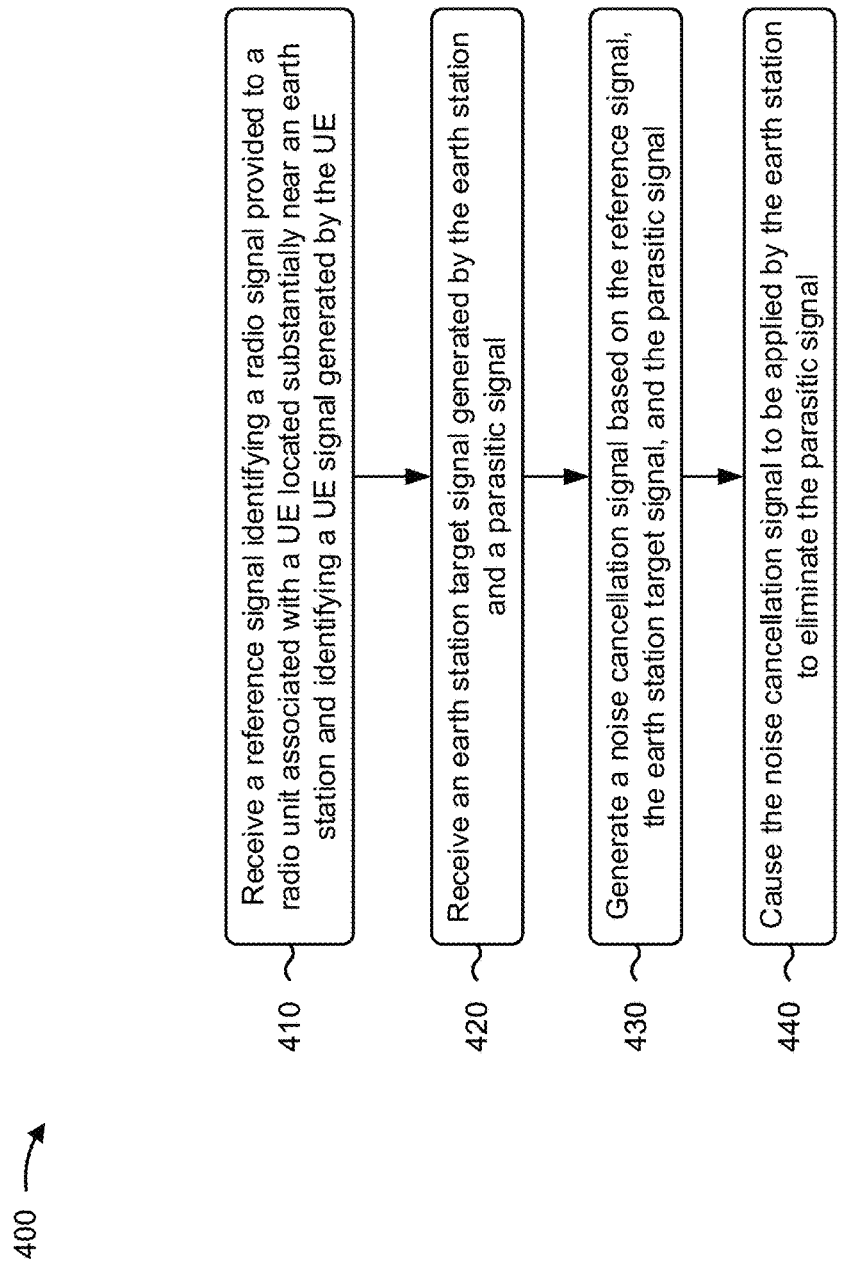
FIG. 4 is a flow chart of an example process for providing satellite earth station and fifth-generation (5G) network sharing noise cancellation.

FIG. 4 is a flow chart of an example process 400 for providing satellite earth station and fifth-generation network sharing noise cancellation. In some implementations, one or more process blocks of FIG. 4 may be performed by a device (e.g., the far edge device 125). In some implementations, one or more process blocks of FIG. 4 may be performed by another device or a group of devices separate from or including the device, such as a special radio unit (e.g., the special radio unit 115-A), a network device (e.g., the network device 120), and/or the like. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving a reference signal identifying a radio signal provided to a radio unit associated with a user equipment located substantially near an earth station and identifying a user equipment signal generated by the user equipment (block 410). For example, the device may receive a reference signal identifying a radio signal provided to a radio unit associated with a user equipment located substantially near an earth station and identifying a user equipment signal generated by the user equipment, as described above. In some implementations, the radio signal provided to the radio unit includes a downlink time division duplex signal. In some implementations, the user equipment signal generated by the user equipment includes an uplink time division duplex signal received by the radio unit.

As further shown in FIG. 4, process 400 may include receiving an earth station target signal generated by the earth station and a parasitic signal (block 420). For example, the device may receive an earth station target signal generated by the earth station and a parasitic signal, as described above. In some implementations, the parasitic signal is generated by one or more of the radio unit or the user equipment.

As further shown in FIG. 4, process 400 may include generating a noise cancellation signal based on the reference signal, the earth station target signal, and the parasitic signal (block 430). For example, the device may generate a noise cancellation signal based on the reference signal, the earth station target signal, and the parasitic signal, as described above. In some implementations, the noise cancellation signal includes an inverted form of the parasitic signal. In some implementations, generating the noise cancellation signal based on the reference signal, the earth station target signal, and the parasitic signal includes determining whether a combination of the earth station target signal and the parasitic signal matches the reference signal; and calculating an inverted and delayed signal, as the noise cancellation signal, when the combination of the earth target signal and the parasitic signal matches the reference signal.

As further shown in FIG. 4, process 400 may include causing the noise cancellation signal to be applied by the earth station to eliminate the parasitic signal (block 440). For example, the device may cause the noise cancellation signal to be applied by the earth station to eliminate the parasitic signal, as described above. In some implementations, causing the noise cancellation signal to be applied by the earth station to eliminate the parasitic signal includes providing the noise cancellation signal to the earth station, via a special radio unit, to cause the earth station to apply the noise cancellation signal to eliminate the parasitic signal. In some implementations, causing the noise cancellation signal to be applied by the earth station to eliminate the parasitic signal includes providing the noise cancellation signal to a tap of the earth station to cause the earth station to utilize the noise cancellation signal to eliminate the parasitic signal.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a device, a reference signal identifying a radio signal provided to a radio unit associated with a user equipment located substantially near an earth station and identifying a user equipment signal generated by the user equipment;
receiving, by the device, an earth station target signal generated by the earth station and a parasitic signal;
generating, by the device, a noise cancellation signal based on the reference signal, the earth station target signal, and the parasitic signal; and
causing, by the device, the noise cancellation signal to be applied by the earth station to eliminate the parasitic signal.

2. The method of claim 1, wherein the noise cancellation signal includes an inverted form of the parasitic signal.

3. The method of claim 1, wherein the parasitic signal is generated by one or more of the radio unit or the user equipment.

4. The method of claim 1, wherein generating the noise cancellation signal based on the reference signal, the earth station target signal, and the parasitic signal comprises:
determining whether a combination of the earth station target signal and the parasitic signal matches the reference signal; and
calculating an inverted and delayed signal, as the noise cancellation signal, when the combination of the earth target signal and the parasitic signal matches the reference signal.

5. The method of claim 1, wherein the radio signal provided to the radio unit includes a downlink time division duplex signal.

6. The method of claim 1, wherein the user equipment signal generated by the user equipment includes an uplink time division duplex signal received by the radio unit.

7. The method of claim 1, wherein causing the noise cancellation signal to be applied by the earth station to eliminate the parasitic signal comprises:
providing the noise cancellation signal to the earth station, via a special radio unit, to cause the earth station to apply the noise cancellation signal to eliminate the parasitic signal.

8. A device comprising:
one or more processors configured to:
receive a downlink signal provided to a radio unit associated with a user equipment, located substantially near an earth station, or an uplink signal received by the radio unit;
receive a satellite and parasitic signal from a tap of the earth station;
determine that the satellite and parasitic signal matches the downlink signal or the uplink signal;
calculate an inverted and delayed signal based on determining that the satellite and parasitic signal matches the downlink signal or the uplink signal; and
cause the earth station to utilize the inverted and delayed signal to eliminate the parasitic signal.

9. The device of claim 8, wherein the one or more processors, to cause the earth station to utilize the inverted and delayed signal to eliminate the parasitic signal, are configured to:
provide the inverted and delayed signal to another tap of the earth station to cause the earth station to utilize the inverted and delayed signal to eliminate the parasitic signal.

10. The device of claim 8, wherein the inverted and delayed signal includes an inverted form of the parasitic signal.

11. The device of claim 8, wherein the parasitic signal is generated by one or more of the radio unit or the user equipment.

12. The device of claim 8, wherein the downlink signal includes a downlink time division duplex signal.

13. The device of claim 8, wherein the uplink signal includes an uplink time division duplex signal.

14. The device of claim 8, wherein the device includes a special radio unit.

15. A non-transitory computer-readable medium storing a set of instructions, the set of instructions comprising:
one or more instructions that, when executed by one or more processors of a device, cause the device to:
receive a downlink signal provided to a radio unit associated with a user equipment, located substantially near an earth station, or an uplink signal received by the radio unit;
receive a satellite and parasitic signal from the earth station, via a special radio unit;
determine whether the satellite and parasitic signal matches the downlink signal or the uplink signal;
calculate an inverted and delayed signal when the satellite and parasitic signal matches the downlink signal or the uplink signal; and
cause the earth station to utilize the inverted and delayed signal to eliminate the parasitic signal.

16. The non-transitory computer-readable medium of claim 15, wherein the device includes a network device of a network associated with the radio unit.

17. The non-transitory computer-readable medium of claim 15, wherein the one or more instructions further cause the device to:
forgo calculating the inverted and delayed signal and causing the earth station to utilize the inverted and delayed signal when the satellite and parasitic signal fails to match the downlink signal or the uplink signal.

18. The non-transitory computer-readable medium of claim 15, wherein the inverted and delayed signal includes an inverted form of the parasitic signal.

19. The non-transitory computer-readable medium of claim 15, wherein the parasitic signal is generated by one or more of the radio unit or the user equipment.

20. The non-transitory computer-readable medium of claim 15, wherein the one or more instructions, that cause the device to calculate the inverted and delayed signal when the satellite and parasitic signal matches the downlink signal or the uplink signal, cause the device to:
identify a magnitude of a parasitic signal embedded in the satellite and parasitic signal; and invert a quadrature of the parasitic signal, to calculate the inverted and delayed signal, based on identifying the magnitude of the parasitic signal.

* * * * *